(12) United States Patent
Dou et al.

(10) Patent No.: US 11,572,673 B2
(45) Date of Patent: Feb. 7, 2023

(54) WORK VEHICLE POWER SYSTEM WITH DECOUPLED ENGINE AIR SYSTEM COMPONENTS

(71) Applicant: Deere & Company, Moline, IL (US)

(72) Inventors: Danan Dou, Cedar Falls, IA (US); Eric J. Haaland, Waverly, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/358,587

(22) Filed: Jun. 25, 2021

(65) Prior Publication Data

US 2022/0412053 A1    Dec. 29, 2022

(51) Int. Cl.
```
E02F 9/20      (2006.01)
F02D 41/00     (2006.01)
F02M 26/05     (2016.01)
F02B 37/00     (2006.01)
F02B 37/013    (2006.01)
F01D 15/10     (2006.01)
```
(Continued)

(52) U.S. Cl.
CPC ............ E02F 9/2075 (2013.01); F01D 15/10 (2013.01); F02B 37/004 (2013.01); F02B 37/013 (2013.01); F02D 21/04 (2013.01); F02D 41/0007 (2013.01); F02M 26/05 (2016.02); F02M 26/08 (2016.02)

(58) Field of Classification Search
CPC ........ F02M 26/08; F02M 26/09; F02M 26/05; F02D 21/04; F02B 37/004; F02B 37/013; F01D 15/10
See application file for complete search history.

(56) References Cited

U.S. PATENT DOCUMENTS 6,062,026 A    5/2000   Woollenweber et al.
6,138,649 A   10/2000   Khair et al.
(Continued)

FOREIGN PATENT DOCUMENTS

DE        9421145 U1     5/1995
DE    102006015390 A1   10/2007
(Continued)

OTHER PUBLICATIONS

USPTO Non-Final Office Action issued in U.S. Utility U.S. Appl. No. 17/237,876 dated Aug. 31, 2021.
(Continued)

*Primary Examiner* — J. Todd Newton
(74) *Attorney, Agent, or Firm* — Klintworth & Rozenblat IP LLP

(57) ABSTRACT

A power system includes an engine; an exhaust gas recirculation (EGR) system supplying a first portion of the engine exhaust gas from the exhaust manifold to the intake manifold; a turbine generator in communication with the exhaust manifold and configured to be driven by a second portion of the engine exhaust gas from the exhaust manifold to generate electrical power; a power network including at least one battery to store the electrical power generated by the turbine generator; and an electric compressor in fluid communication with the intake manifold and configured to be powered by the electrical power from the at least one battery of the power network and to compress at least a portion of the intake air for the engine.

20 Claims, 3 Drawing Sheets

(51) Int. Cl.
*F02D 21/04* (2006.01)
*F02M 26/08* (2016.01)

(56) References Cited

U.S. PATENT DOCUMENTS

| | | | |
|---|---|---|---|
| 6,647,724 B1 * | 11/2003 | Arnold | F02B 33/36 |
| | | | 60/608 |
| 8,176,736 B2 | 5/2012 | Janssen | |
| 8,181,452 B2 | 5/2012 | Bidner et al. | |
| 8,522,756 B2 | 9/2013 | Vuk et al. | |
| 8,820,056 B2 | 9/2014 | VanDyne et al. | |
| 9,347,365 B2 | 5/2016 | Hunter | |
| 9,540,989 B2 | 1/2017 | Sanchez Perez et al. | |
| 9,869,258 B2 | 1/2018 | Dion | |
| 10,145,320 B1 | 12/2018 | Zeng et al. | |
| 10,641,191 B2 | 5/2020 | Zeng et al. | |
| 11,205,789 B2 | 12/2021 | Tanimoto | |
| 2008/0092861 A1 | 4/2008 | Duffy et al. | |
| 2009/0107142 A1 * | 4/2009 | Russell | F02D 41/0007 |
| | | | 60/608 |
| 2010/0018203 A1 * | 1/2010 | Richards | F02C 7/36 |
| | | | 60/598 |
| 2010/0146968 A1 * | 6/2010 | Simpson | F02B 37/001 |
| | | | 60/605.2 |
| 2011/0016862 A1 | 1/2011 | Song et al. | |
| 2011/0209473 A1 | 9/2011 | Fritz et al. | |
| 2013/0098030 A1 | 4/2013 | Freund et al. | |
| 2013/0297126 A1 | 11/2013 | Yamazaki et al. | |
| 2014/0109571 A1 | 4/2014 | Primus et al. | |
| 2016/0010576 A1 | 1/2016 | Primus et al. | |
| 2016/0265468 A1 | 9/2016 | Takayanagi et al. | |
| 2019/0107066 A1 | 4/2019 | Kurtz et al. | |
| 2019/0383244 A1 | 12/2019 | Kim | |
| 2020/0011229 A1 | 1/2020 | Waldron et al. | |
| 2020/0173354 A1 | 6/2020 | Punjani et al. | |
| 2020/0309059 A1 | 10/2020 | Hotta et al. | |
| 2021/0277849 A1 * | 9/2021 | Rahm | F02D 41/0047 |
| 2022/0090566 A1 | 3/2022 | Magnusson et al. | |
| 2022/0106919 A1 | 4/2022 | Andersson et al. | |

FOREIGN PATENT DOCUMENTS

| | | |
|---|---|---|
| DE | 102009028925 A1 | 3/2011 |
| DE | 102011077148 A1 | 12/2012 |
| DE | 102012202857 A1 | 8/2013 |
| DE | 102015208418 A1 | 10/2016 |
| FR | 3024178 A1 | 1/2016 |
| FR | 3035151 A1 | 10/2016 |
| FR | 3035443 A1 | 10/2016 |
| FR | 3035444 A1 | 10/2016 |
| FR | 3036738 A1 | 12/2016 |
| FR | 3037616 A1 | 12/2016 |
| FR | 3051225 A1 | 11/2017 |
| FR | 3053397 A1 | 1/2018 |
| FR | 3054602 A1 | 2/2018 |
| GB | 804124 | 11/1958 |
| JP | 09268916 A1 | 10/1997 |
| JP | 2001073880 A1 | 3/2001 |
| JP | 2006057570 A | 3/2006 |
| JP | 4788531 B2 | 10/2011 |
| KR | 101999909 B1 | 7/2019 |
| RU | 2719758 C2 | 4/2020 |
| WO | 2013068800 A1 | 5/2013 |
| WO | 2013186373 A1 | 12/2013 |
| WO | 2019219701 A1 | 11/2019 |
| WO | 2020064679 A1 | 4/2020 |
| WO | 2021005613 A1 | 1/2021 |

OTHER PUBLICATIONS

Garrett Advancing Motion, 48V Electric Compressor for Mild Hybrid Vehicles, © 2021 Garrett Motion Inc. (9 pages).
Eaton, Diesel Engine EGR Pump, Precision Air Flow, https://www.eaton.com/us/en-us/products/engine-solutions/superchargers/TVS-technology-applications/tvs-diesel-egr-pump.html, © 2021 Eaton. (5 pages).
Garrett Advancing Motion, E-Turbo Technology Accelerating Global Powertrain Electrification Trends Beginning with Mercedes-AMG, Media Pressroom—Press Releases, Jul. 22, 2020, © 2021 Garrett Motion Inc. (4 pages).
University Wisconsin, Electric Turbo Chargers, Overview of Forced Induction System, WEMPEC Electrification of FIS, EFIS Topologies, © Board of Regents of the University of Wisconsin System, Mar. 2016. (1 page).
U.S. Utility U.S. Appl. No. 17/237,876, filed Apr. 22, 2021.
U.S. Utility U.S. Appl. No. 17/306,604, filed May 3, 2021.
U.S. Utility U.S. Appl. No. 17/308,331, filed May 5, 2021.
U.S. Utility U.S. Appl. No. 17/319,256, filed May 13, 2021.
U.S. Utility U.S. Appl. No. 17/324,388, filed May 19, 2021.
USPTO Final Office Action issued in U.S. Utility U.S. Appl. No. 17/237,876 dated Mar. 8, 2022.
USPTO Non-Final Office Action issued in U.S. Utility U.S. Appl. No. 17/306,604 dated Sep. 13, 2022. (13 pages).
USPTO Non-Final Office Action issued in U.S. Utility U.S. Appl. No. 17/406,656 dated Sep. 15, 2022. (16 pages).
USPTO Non-Final Office Action issued in U.S. Utility U.S. Appl. No. 17/308,331 dated Jul. 21, 2022. (23 pages).
USPTO Non-Final Office Action issued in U.S. Utility U.S. Appl. No. 17/237,876 dated Aug. 16, 2022. (18 pages).

* cited by examiner

WORK VEHICLE POWER SYSTEM WITH DECOUPLED ENGINE AIR SYSTEM COMPONENTS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to power systems and method associated with the engine of the work vehicle.

BACKGROUND OF THE DISCLOSURE

Heavy work vehicles, such as used in the construction, agriculture and forestry industries, typically include a power system with an internal combustion engine. For many work vehicles, the power system includes a diesel engine that may have higher lugging, pull-down, and torque characteristics for associated work operations. It is common for internal combustion engine systems on many work vehicles to include one or more turbochargers that boost engine intake airflow to improve performance. Each turbocharger includes a turbine and a compressor, with the turbine driven by exhaust gas from the engine and the compressor, in turn, being driven by the turbine to compress air provided to the engine for combustion. The turbine and compressor are linked together by a shaft to operate in concert with one another.

SUMMARY OF THE DISCLOSURE

The disclosure provides a power system of a work vehicle with decoupled engine air system components.

In one aspect, the disclosure provides a power system for a work vehicle. The power system includes an engine containing one or more piston-cylinder arrangements, an intake manifold configured to receive and direct intake air into the one or more piston-cylinder arrangements for combustion to generate exhaust gas, and an exhaust manifold configured to receive the engine exhaust gas from the one or more piston-cylinder arrangements; an exhaust gas recirculation (EGR) system including an EGR mixer coupled to receive a first portion of the engine exhaust gas from the exhaust manifold, the EGR mixer configured to mix the first portion of the engine exhaust gas with fresh air as the intake air and further coupled to direct the intake air into the intake manifold of the engine; a turbine generator in communication with the exhaust manifold and configured to be driven by a second portion of the engine exhaust gas from the exhaust manifold to generate electrical power; a power network including at least one battery to store the electrical power generated by the turbine generator; and an electric compressor in fluid communication with the intake manifold and configured to be powered by the electrical power from the at least one battery of the power network and to compress at least a portion of the intake air for the engine.

In another aspect, the disclosure provides a method for operating a power system of a work vehicle. The method includes operating an engine to generate exhaust gas; arranging a turbine generator to be driven by the exhaust gas to generate electrical power; storing the electrical power in at least one battery of a power network; and powering an electric compressor with the electrical power from the at least one battery of the power network to compress at least a portion of intake air for the engine.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
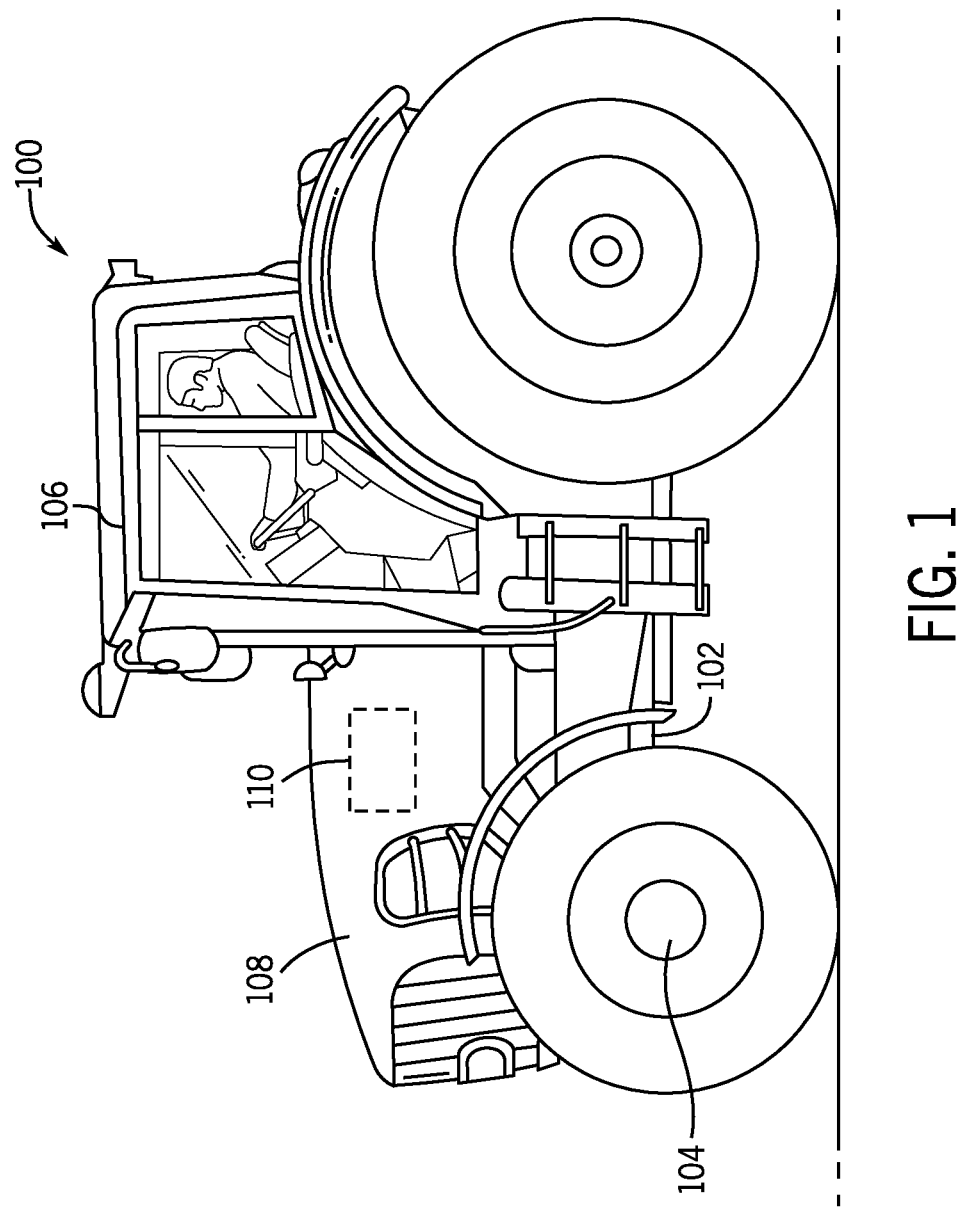
FIG. 1 is a simplified side view of an example work vehicle in the form of a tractor in which a power system may be used in accordance with this disclosure.

The following describes one or more example embodiments of the disclosed power system and method, as shown in the accompanying figures of the drawings described briefly above. Various modifications to the example embodiments may be contemplated by one of skill in the art.

Work vehicles may include power systems with diesel engines to produce torque in a wide range of applications, such as long-haul trucks, tractors, agricultural or construction vehicles, surface mining equipment, non-electric locomotives, stationary power generators and the like. In some vehicles, power systems may include one or more turbochargers and/or other engine air system components that attempt to increase efficiency and performance of the engine. In particular, a typical turbocharger provides increased engine intake pressure through work of a compressor that is connected through a rotating shaft to a power turbine, which itself is driven by exhaust gas from the engine. Some modern diesel engines also include an exhaust gas recirculation (EGR) system to improve fuel efficiency and reduce engine out emissions by recirculating a portion of exhaust gas back into the engine. For example, the EGR arrangement may function to reduce nitrogen oxide (NOx) emissions by lowering the oxygen concentration in the combustion chamber, as well as through heat absorption. The remaining portion of the exhaust may flow through an exhaust treatment system to remove particulates, NOx, and other types of pollutants.

However, conventional power systems may have a several drawbacks, particularly due to the relationship between the turbine coupled to the exhaust path and the compressor that provides intake air. Conventional systems provide the compressor and turbine as being integrated through a mechanical shaft; and therefore, the compressor rotating speed is dictated by turbine rotating speed, thereby complicating the control issues, efficiency, and sizing. For example, mismatches of the desired boost and turbine power may occur in several occasions, including high speed and high load operating conditions that requires exhaust gas to be partially diverted to avoid turbocharger over-speeding; lower speed and lower power operating conditions when the available exhaust energy is insufficient to power the compressor and provide enough boost to intake air, leading to lower torque limits at low speed; and/or a sudden increased load condition that takes time for the turbine to spin-up (e.g., turbo-lag). Moreover, a physically coupled compressor and turbine arrangement is typically positioned at exhaust manifold, which forces the compressor to be near the exhaust manifold, thereby requiring extra pipes to route the intake air from the compressor back to the air intake manifold.

Generally, the ability to control the EGR flow depends on the pressure difference between exhaust manifold and intake manifold, which complicates both the air/fuel (A/F) ratio and EGR rate control algorithms, particularly during transient operations. In one scenario, when exhaust manifold pressure is higher than intake manifold, the engine may suffer more pumping loss that increases fuel consumption. In other words, if a more efficient turbocharger is selected to reduce the engine pumping loss, it will be difficult to drive EGR in order to use EGR to reduce engine out NOx and advance fuel injection timing to improve engine fuel consumptions. Additional drawbacks with a more efficient turbo match include reduced boost and torque output at low speed and sluggish torque response.

According to examples discussed herein, the power system includes engine air system (or turbocharger) components in which the turbine and compressor are mechanically separated (or decoupled), and instead, include one or more individual turbine generators and electric compressors. The various power system components are coupled together through an electrical power network that enables transitions between mechanical and electrical power, including the turbine generators that generate electrical power and electric compressors that are driven by electrical power. Such arrangements may further include an electrical EGR pump to facilitate on-demand air flow, thereby avoiding pumping losses and engine pressure drops and enabling more flexibility and specific control. The decoupled turbine generator and electric compressor arrangements enable additional flexibility in air systems, more precise and responsive A/F ratios, and enhanced exhaust temperature control to reduce emissions, independent sizing and control.

The following describes one or more example implementations of the disclosed systems and methods for improving the power system with mechanically decoupled turbocharger, EGR, and/or other engine air system components, as compared to conventional systems.

Referring to FIG. 1, in some embodiments, the disclosed power systems and methods may be used with a work vehicle 100 embodied as a tractor. In other examples, the disclosed system and method may be implemented in other types of vehicles or machines, including stationary power systems and vehicles in the agricultural, forestry, and/or construction industries.

As shown, the work vehicle 100 may be considered to include a main frame or chassis 102, a drive assembly 104, an operator platform or cabin 106, a power system 108, and a controller 110. As is typical, the power system 108 includes an internal combustion engine used for propulsion of the work vehicle 100, as controlled and commanded by the controller 110 and implemented by the drive assembly 104 mounted on the chassis 102 based on commands from an operator in the cabin 106. As described below, the power system 108 may include systems and components to facilitate various aspects of operation. For example and in addition to the engine, the power system 108 may include an intake apparatus to direct air into the engine, one or more engine air system arrangements to improve efficiency and/or power, an exhaust recirculation (EGR) system that redirects a portion of engine exhaust back into the engine, and an exhaust treatment system that functions to reduce pollutants prior to emission of the engine exhaust into the atmosphere. As also described below, such power system components may be arranged and designed to selectively and individually generate or use electrical power to perform various functions as an integrated system, including improvements in performance, efficiency, and capability.

As noted, the work vehicle 100 includes the controller 110 (or multiple controllers) to control one or more aspects of the operation, and in some embodiments, facilitate implementation of the power system 108, e.g., operation of the various components and control elements. The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

In some examples, the work vehicle 100 may further include various sensors that function to collect information about the work vehicle 100 and/or surrounding environment. Such information may be provided to the controller 110 for evaluation and/or consideration for operating the power system 108. As examples, the sensors may include operational sensors associated with the vehicle systems and components discussed, including engine and transmission sensors, fuel sensors, and battery and power sensors. Such sensor and operator inputs may be used by the controller 110 to determine an operating condition (e.g., a load, demand, or performance requirement), and in response, generate appropriate commands for the various components of the power system 108 discussed below.

Additional information regarding the power system 108, particularly the components associated with gas flows and power distribution are provided below with reference to FIG. 2A. Although not shown or described in detail herein, the work vehicle 100 may include any number of additional or alternative systems, subsystems, and elements.

Figure 2A:
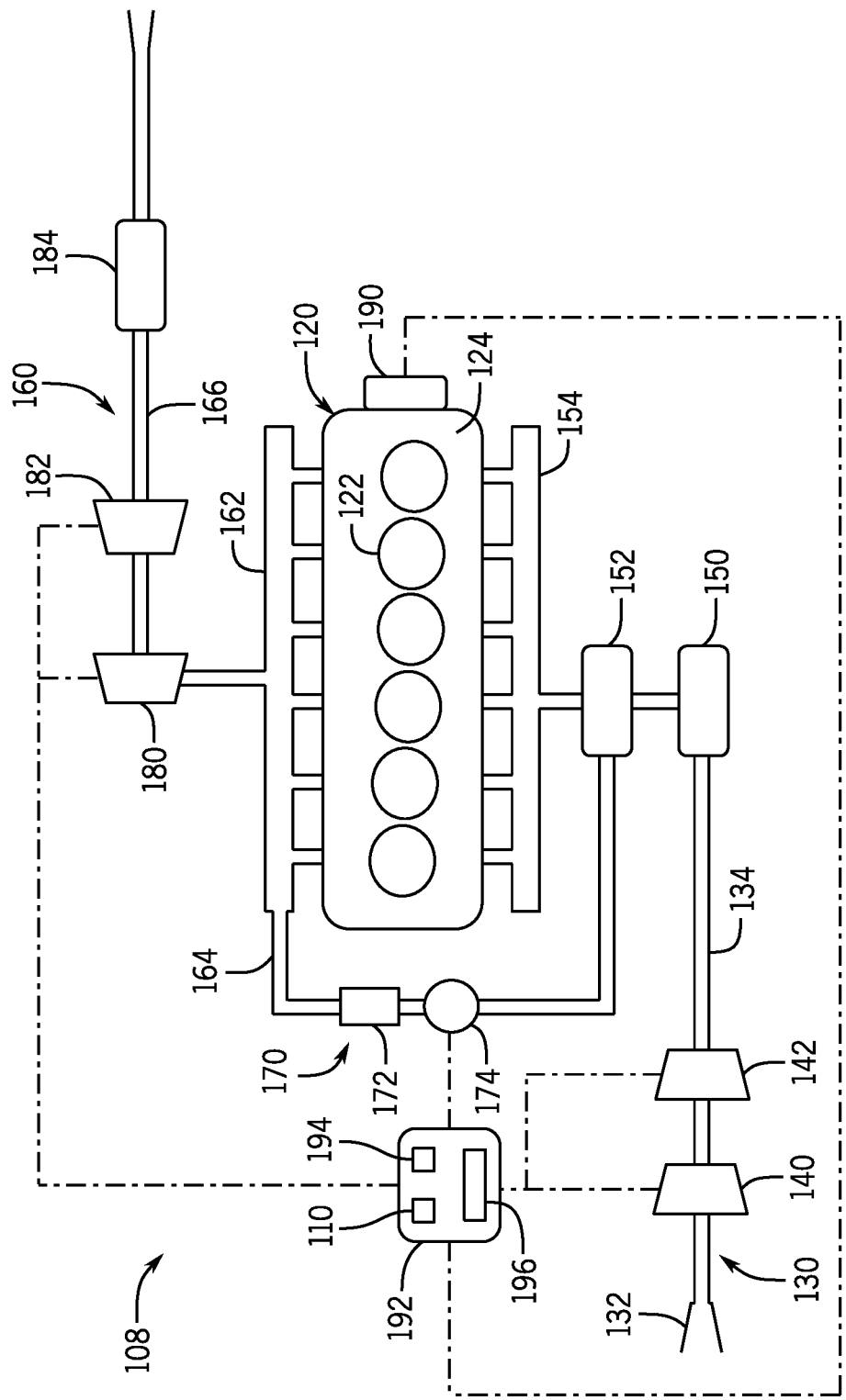
FIG. 2A is a simplified schematic diagram of a power system in accordance with an example embodiment.

Referring to FIG. 2A, there is shown a schematic illustration of the power system 108 for providing power to the work vehicle 100 of FIG. 1, although the characteristics described herein may be applicable to a variety of machines, such as on-highway trucks, construction vehicles, marine vessels, stationary generators, automobiles, agricultural vehicles, and recreation vehicles. The configuration of FIG. 2A is just one example of the power system 108 and example embodiments according to the disclosure herein may be provided in other configurations.

As introduced above, the power system 108 includes an engine 120 configured to generate power for propulsion and various other systems. Generally, engine 120 may be any kind of internal combustion engine that receives and combusts intake gas to generate energy and produce an exhaust gas, such as a gasoline engine, a diesel engine, a gaseous fuel burning engine (e.g., natural gas) or any other exhaust producing engine. For example, the engine 120 may be a diesel engine with any number or configuration of piston-cylinder arrangements 122 within an engine block 124. In the illustrated implementation, the engine 120 is an inline-6 (I-6) engine defining six piston-cylinder arrangements 122. In addition to those discussed below, the engine 120 may include any suitable feature, such as fuel systems, air systems, cooling systems, peripheries, drivetrain components, sensors, etc.

Generally, the power system 108 and/or engine 120 may be considered to include an intake apparatus 130 that directs fresh or ambient air through an inlet 132 and into the power system 108 as fresh intake gas via an engine intake conduit 134. As shown, the intake apparatus 130 may include or otherwise interact with one or more boost components as engine air system components, particularly one or more electric compressors 140, 142. During operation, the intake apparatus 130 directs the fresh intake gas through the first electric compressor 140 to be compressed, thereby increasing the amount of air subsequently forced into the engine 120 for improved engine efficiency and power output. In some examples, the intake gas may be further compressed by the second electric compressor 142. In such an example, the electric compressors 140, 142 may be arranged as series (as shown) or in parallel (e.g., with each electric compressor 140, 142 compressing a portion of the intake air). In other examples, the second electric compressor 142 may be omitted.

Generally, the compressors 140, 142 may be any type of electric compressor (or eCompressor). In other words, the electric compressors 140, 142 use an electric motor to convert electrical power into mechanical work that compresses the air flowing through the conduit 134. In addition to the intake air for the engine 120, the electric compressors 140, 142 may provide compressed air to other parts of the engine or vehicle systems.

The intake apparatus 130 may further include a cooler 150 arranged along the engine intake conduit 134 downstream of the electric compressors 140, 142 to reduce the temperature of the compressed fresh intake gas, e.g., so as to increase the unit mass per unit volume of the charge air for improved volumetric efficiency. The cooler 150 may be any suitable mechanism for cooling the air for the engine 120. In one example, the cooler 150 may be a charge cooler in the form of an air-air heat exchanger that reduces intake air temperature from compression by rejecting the heat to ambient air flowing through the heat exchanger; although in other examples, the cooler 150 may be configured as a liquid-air heat exchanger that transfers waste heat from the charge air to an intermediate liquid (e.g., water), which finally rejects the heat to the ambient air. Moreover, multiple coolers 150 may be provided, including a combination of charge coolers and interstage coolers. Although depicted as downstream of the electric compressors 140, 142, the cooler 150 may be arranged upstream of one or both of the electric compressors 140, 142.

Downstream of the cooler 150, the engine intake conduit 134 is fluidly coupled to an intake mixer 152 that receives the fresh intake gas. As described below, the intake mixer 152 may also receive a portion of the engine exhaust as recirculated gas. In some examples, the intake mixer 152 may mix the fresh intake gas and recirculated gas (generally, intake gas) prior to directing the intake gas into an intake manifold 154. In some examples, the intake mixer 152 and intake manifold 154 may be combined (i.e., a dedicated mixer 152 may be omitted and/or the intake manifold 154 may be considered part of the EGR system 170, discussed below). In any event, the intake manifold 154 distributes the intake gas into the piston-cylinder arrangements 122 of the engine block 124. As is typical, the intake gas is mixed with fuel and ignited such that the resulting combustion products drive the mechanical output of the engine 120.

During combustion, the engine 120 produces an exhaust gas that is received by an exhaust apparatus 160, particularly an exhaust manifold 162 of the exhaust apparatus 160. For example, the exhaust manifold 162 is in fluid communication with engine piston-cylinder arrangements such that, during an exhaust stroke, at least one exhaust valve (not shown) opens, allowing the exhaust gas to flow out of the cylinders into the exhaust manifold 162. The exhaust manifold 162 is generally configured to receive and distribute the exhaust via outlets to a first exhaust conduit 164 and a second exhaust conduit 166.

The first exhaust conduit 164 directs a first portion of the exhaust gas through an exhaust gas recirculation (EGR) system 170. Generally, the EGR system 170 functions to recirculate a portion of the exhaust gas generated by the engine 120 into the intake mixer 152 for mixing with the fresh intake air, which in turn, reduces the formation of NOx during combustion than may otherwise occur. In some examples, the flow of recirculated gas through the EGR system 170 may be at least partially controlled via an EGR distribution valve (not shown) positioned on the first or second exhaust conduits 164, 166. Any suitable amount of exhaust gas may be recirculated (e.g., 10%-20%).

In this embodiment, an EGR cooler 172 is positioned along the first exhaust conduit 164 to cool the recirculated gas flowing therethrough, although in some examples, a further conduit and valve arrangement may be provided to bypass the EGR cooler 172 under certain conditions. The EGR cooler 172 may be any suitable device configured to lower the temperature of the recirculated gas flowing through the exhaust conduit 164. Generally, the EGR cooler 158 includes one or more recirculated gas passages and one or more coolant passages arranged such that heat may be transferred from the recirculated gas to the coolant. The coolant may be provided by a cooling circuit and may be, for example, a mixture of ethylene glycol and water, although other fluids may be used, including water. Although not shown, an EGR distribution valve may be provided to appropriately control the recirculated gas through or around the EGR cooler 172 based on conditions such as coolant temperature.

The EGR pump 174 is arranged on the conduit 164 to control and facilitate the flow of gas to the mixer 152, either downstream (as shown) or upstream of the EGR cooler 172. In one embodiment, the EGR pump 174 is constructed as a roots style pump having rotors driven by an electric motor, although it is recognized that the EGR pump 174 may alternately be configured as a pump of a different style or construction, such as a screw or scroll or vane compressor, for example.

As noted above, only a portion of the exhaust gas from the exhaust manifold 162 is directed through the EGR system 170. The second portion of exhaust gas is directed from the exhaust manifold 162 through a second exhaust conduit 166. Although not shown, the quantity and nature of the exhaust gas through the second exhaust conduit 166 may be controlled by an exhaust gas throttle valve.

A further engine air system (or turbocharger) component in the form of a first turbine generator (or generally, turbine) 180 may be positioned within the path of the second exhaust conduit 166 such that the second portion of the exhaust gas through the second exhaust conduit 166 rotates the turbine generator 180 to generate power. In one example, the first turbine generator 180 functions as a generator to generate electrical power, as discussed in greater detail below.

The exhaust gas then flows via the conduit 166 into a second turbine generator (or generally, turbine) 182 to generate additional power. As above, the second turbine generator 182 may function as a generator to generate electrical power, as described below. In this example, the turbine generators 180, 182 may be arranged in series, although other arrangements may be provided. Moreover, the second turbine generator 182 may be optionally omitted.

Downstream of the turbine generators 180, 182, the exhaust gas may flow through an exhaust treatment system 184 arranged on the exhaust conduit 166. Other embodiments may not have an exhaust treatment system 184. Generally, the exhaust treatment system 184 functions to treat the exhaust gas passing therethrough. Although not described in detail, the exhaust treatment system 184 may include various components to reduce undesirable emissions. As examples, the exhaust treatment system 184 may include an inlet tube, diesel oxidation catalyst (DOC), a diesel particulate filter (DPF), a selective catalytic reduction (SCR) system, and an outlet tube. The DOC of the exhaust treatment system 184 may be configured in a variety of ways and contain catalyst materials useful in collecting, absorbing, adsorbing, reducing, and/or converting hydrocarbons, carbon monoxide, and/or nitrogen oxides (NOx) contained in the exhaust. The DPF of the exhaust treatment system 184 may be any of various particulate filters known in the art configured to reduce particulate matter concentrations, e.g., soot and ash, in the exhaust. The SCR system of the exhaust treatment system 184 functions to reduce the amount of NOx in the exhaust flow, such as by selectively injecting a reductant into the flow of exhaust that, upon mixing with the exhaust, evaporates and decomposes or hydrolyzes to produce ammonia, which reacts with NOx for reduction into less harmful emissions. After being treated by the exhaust treatment system 184, the exhaust gas is expelled into the atmosphere via a tailpipe.

In one example, the power system 108 may further include a motor (or starter) generator 190 that may operate as a starter motor or as a generator. In particular, the motor generator 190 may be selectively arranged proximate to the engine 120, including being rotationally coupled to a drive shaft of the engine 120. As such, the motor generator 190 may be mechanically driven by the engine 120 during operation in order to generate electricity; and/or the motor generator 190 may be powered to mechanically drive the engine 120, e.g., during a start mode or a boost mode. Portions of the engine 120 on which the motor generator 190 may be coupled include the crankshaft, geartrain, flywheel, and/or auxiliary drives.

The power system 108 further includes one or more power networks 192 to receive, store, convert, distribute, and manage electrical power to the various components of the power system 108 based on commands from a controller 110 (e.g., corresponding to controller 110 as referenced below or a similar dedicated controller). In particular, the controller 110 may be in communication with, or considered part of, the power network 192 to manage and distribute the operation and/or electrical power throughout the power system 108.

As such, the controller 110 may be in communication with the engine 120, intake apparatus 130, electric compressors 140, 142, charge cooler 150, exhaust apparatus 160, EGR system 170, and/or the turbine generators 180, 182; and the power network 192 may distribute electrical power between the electric compressors 140, 142, EGR pump 174, turbine generators 180, 182, and motor generator 190. In particular, the controller 110 may, responsive to received inputs, operate to identify a current operational mode or conditions of the power system 108 and output control signals to one or more components in the power system 108 to control and/or modify operation, including management and distribution of electrical power via the power network 192, as described in greater detail below.

Generally, in addition to controller 110, the power network 192 may be considered to include one or more batteries 194 and one or more power components 196 (e.g., inverter/rectifier devices, networking and control equipment, and the like). The batteries 194 of the power network 192 may be any type of energy storage devices, including, as an example, Li-ion batteries. The batteries 194 and power components 196 may accommodate any suitable high or low voltages, e.g., 700V, 400V, 48V, or the like.

During operation, the power network 192 (e.g., batteries 194 and power components 196) may receive and/or store electrical power generated from the turbine generators 180, 182 and/or motor generator 190. As noted above, the turbine generators 180, 182 and motor generator 190 operate as generators that convert mechanical power (e.g., driven by exhaust of the engine 120) to electrical power. Further, the power network 192 provides electrical power to drive the electric compressors 140, 142, EGR pump 174, and/or motor generator 190, which convert electrical power back to mechanical power. Although the controller 110 and power network 192 operate these components as an integrated system, the components (particularly the electric compressors 140, 142 and turbine generators 180, 182) are mechanically decoupled from one another. Due to the potentially high rotational speeds of the electric compressors 140, 142 and/or turbine generators 180, 182, the power network 192 may include wide band gap power electronics, which enables the use of engine coolant and reduction of switching losses.

As introduced above and although not shown in detail in FIG. 2, the power system 108 may further include individual cooling mechanisms or one or more integrated cooling circuits. In particular, a cooling circuit may be incorporated into the various components to remove heat by distributing a cooling media. Example components that utilize a cooling circuit may include the electric compressors 140, 142, the EGR pump 174, turbine generators 180, 182, and/or the power network 192. In one example, the coolant may be a mixture of ethylene glycol and water, although other fluids may be used, including engine oil or water. For example, the power system 108 may include a cooling circuit that maintains a relatively low temperature (e.g., less than 100° C., less than 60° C., or the like) for the batteries and other power network 192.

As noted, the power system 108 eschews "mechanical turbochargers" in which the compressors and turbines are mechanically joined in favor of a set of electrified air system components with energy flow and control by an electrical power network. This provides a number of operations and advantages.

In particular, the engine 120 generates exhaust during operation to drive one or more of the turbine generators 180, 182 such that electrical energy may be extracted. Since the turbine generators 180, 182 are not mechanically coupled to the electric compressors 140, 142, the turbine generators 180, 182 may be sized and operated without consideration of the electric compressors 140, 142. The electrical energy may be stored in the batteries 194 or conditioned and provided more directly to various selected components upon command via the power components 196 as needed or desired, including to electrically drive the electric compressors 140, 142 to provide engine boost. The mechanical independence enables improved performance with respect to engine operation, emission control, and EGR control.

Since the electric compressors 140, 142 are electrically driven and mechanically independent from the turbine generators 180, 182, the electric compressors 140, 142 may provide on-demand increases in manifold pressure, regardless of exhaust pressure, and eliminate or mitigate turbo lag. Further, since the electric compressors 140, 142 and turbine generators 180, 182 are independent with respect to speed and power, the electric compressors 140, 142 and turbine generators 180, 182 may be individually optimized to reduce any potential negative engine pressure differences and/or reduce or eliminate pumping loss. This is particularly appropriate under certain operating conditions. The power system 108 may command increased generation from the turbine generators 180, 182 during transient deceleration. At altitude conditions, the power system 108 may command increased generation from the turbine generators 180, 182 and/or additional boost from the electric compressors 140, 142. Since many of the components of the power system 108 are electrically driven and electronically controlled, such operation may provide rich data streams for control feedback, diagnostics, and high system level integration for customer value extraction. In effect, the controller 110 may individually consider, address, and implement modifications to the intake and exhaust pressures.

With respect to emission control, the electric compressors 140, 142 and turbine generators 180, 182 may cooperate to provide exhaust temperature control by either providing more air to lean-out the combustion or by extracting more exhaust energy to reduce exhaust temperatures (e.g., to an optimal range for best SCR performance in the exhaust treatment system 184). In some embodiments, the controller 110 may also command the power network 192 to provide power to the motor generator 190 to load the engine 120 (e.g., without requiring additional fuel), which in turn facilitates SCR warm-up within the exhaust treatment system 184.

Further, the controller 110 may also command the power network 192 to power to the EGR pump 174 to provide additional optimized operation with the electric compressors 140, 142 and turbine generators 180, 182, including the ability to calibrate the engine based on optimal EGR rate and A/F ratio for performance and emission controls. The use of EGR pump 174 may eliminate the need to have elevated exhaust manifold pressure relative to intake manifold pressure, thereby reducing pumping losses and improving fuel consumption. In effect, the power system 108 provides hybrid capabilities for load leveling.

Figure 2B:
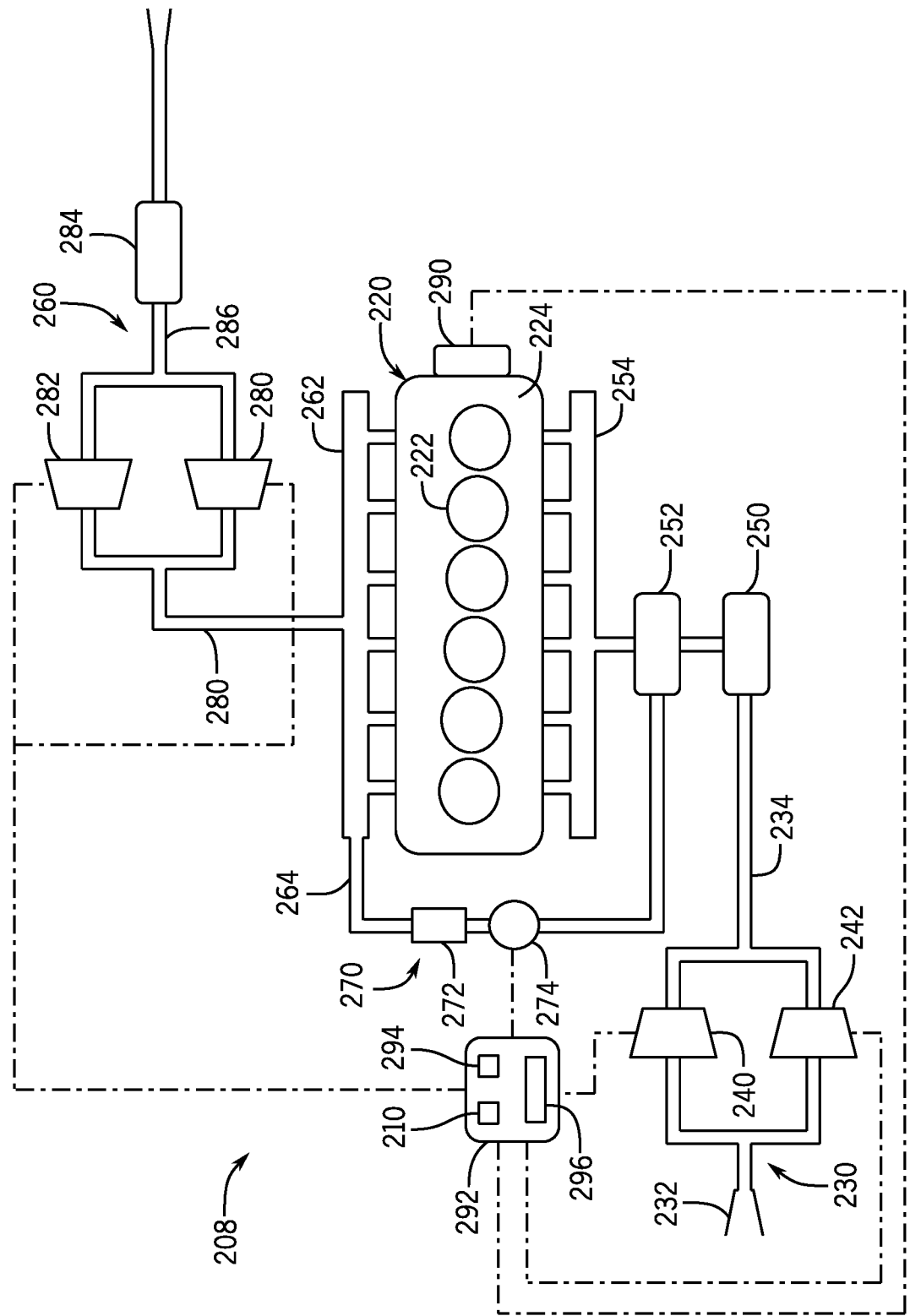
FIG. 2B is a simplified schematic diagram of a power system in accordance with a further example embodiment.

As noted above, the power system according to example embodiments described above may have various configurations. A further example is depicted by the block diagram of FIG. 2B, which is a power system 208 operated with a controller 210. Unless otherwise noted, the power system 208 of FIG. 2B is identical to the power system 108 of FIG. 2A discussed above. Moreover, the configuration of FIGS. 2A and 2B may be combined.

As above, the power system 208 may include an engine 220 with piston-cylinder arrangements 222 within an engine block 224. As also above, the power system 208 may be considered to include an intake apparatus 230 that directs fresh or ambient air through an inlet 232 via an engine intake conduit. In this example, the power system 208 includes a pair of electric compressors 240, 242 that are arranged in a parallel configuration, e.g., so each of the compressors 240, 242 may compress a portion of the intake air. The intake apparatus 230 may further include a cooler 250, exhaust apparatus 260, exhaust manifold 262, first and second exhaust conduits 264, 266, EGR system 270, EGR cooler 272, EGR pump 274, exhaust treatment system 284, motor generator 290, power network 292, batteries 294, and power components 296, similar to those discussed above. In this example, the power system 208 includes a pair of turbine generators 280, 282 that are arranged in a parallel configuration, e.g., so each of the turbine generators 280, 282 may be driven by a portion of the exhaust gas.

As such, the power systems 108, 208 may include various combination of electric compressors 240, 242 and turbine generators 280, 282, including configurations with a single electric compressor; a single turbine: a single compressor with dual series or parallel turbine generators; dual series or parallel compressors with a single turbine generator; and/or dual series configurations with dual parallel configurations. In some examples, the series configurations may provide higher pressure ratios, while parallel configurations may provide other advantages.

Accordingly, the power system eschews "mechanical turbochargers" in which the compressors and turbines are mechanically joined in favor of a set of electrified air system components with energy flow and control by an electrical power network. The power network, in combination with the one or more electric compressors, one or more turbine generators, EGR pump, and/or motor generator may operate as a mechanism of bi-directional electromechanical converters to perform the functions of the power system. The power system includes a platform architecture for an electrified engine that may provide improved fuel consumption, higher performance, and reduced criteria pollutants.

In some examples, operation of the power system may be embodied as a method. For example, the method includes: operating an engine to produce exhaust; driving one or more turbine generators to generate electrical power; storing the electrical power; driving one or more electric compressors with the stored electrical power to compress intake air for the engine; and/or powering one or more of an EGR pump and/or starter.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Also, the following examples are provided, which are numbered for easier reference.

1. A power system for a work vehicle, comprising: an engine including one or more piston-cylinder arrangements, an intake manifold configured to receive and direct intake air into the one or more piston-cylinder arrangements for combustion to generate exhaust gas, and an exhaust manifold configured to receive the engine exhaust gas from the one or more piston-cylinder arrangements; an exhaust gas recirculation (EGR) system configured to receive a first portion of the engine exhaust gas from the exhaust manifold, to mix the first portion of the engine exhaust gas with fresh air as the intake air, and to supply the intake air into the intake manifold of the engine; a turbine generator in communication with the exhaust manifold and configured to be driven by a second portion of the engine exhaust gas from the exhaust manifold to generate electrical power; a power network including at least one battery to store the electrical power generated by the turbine generator; and an electric compressor in fluid communication with the intake manifold and configured to be powered by the electrical power from the at least one battery of the power network and to compress at least a portion of the intake air for the engine.

2. The power system of example 1, wherein the EGR system includes an EGR pump in communication with the exhaust manifold and configured to pump the first portion of the engine exhaust gas from the exhaust manifold to the intake manifold.

3. The power system of example 2, wherein the EGR pump is an electric EGR pump that is powered by the electrical power from the at least one battery of the power network.

4. The power system of example 2, wherein the EGR system further includes an EGR cooler for cooling the first portion of the engine exhaust gas.

5. The power system of example 1, further comprising a motor generator coupled to the engine and alternatively configured to be driven by the engine or to drive the engine.

6. The power system of example 5, wherein the motor generator, upon being driven by the engine, is configured to generate additional electrical power that is then also stored in the at least one battery of the power network, and, to drive the engine, is configured to be powered by the electrical power stored by the at least one battery of the power network.

7. The power system of example 1, further comprising a controller coupled to the power network and configured to control distribution of the electrical power between the turbine generator and the electric compressor.

8. The power system of example 7, wherein the controller is configured to independently command the turbine generator and the electric compressor.

9. The power system of example 1, further comprising an exhaust treatment system in fluid communication to receive and treat the second portion of the engine exhaust gas downstream of the turbine generator.

10. The power system of example 1, wherein the electric compressor is a first electric compressor configured to compress at least a first portion of the intake air and the power system further comprises a second electric compressor in communication with the intake manifold and configured to compress at least a second portion of the intake air for the engine.

11. The power system of example 10, wherein the first electric compressor and the second electric compressor are arranged in series such that the second portion of the intake air is also the first portion of the intake air.

12. The power system of claim 10, wherein the first electric compressor and the second electric compressor are arranged in parallel such that the second portion of the intake air is different than the first portion of the intake air.

13. The power system of example 1, wherein the turbine generator is a first turbine generator and the power system further comprises a second turbine generator in communication with the exhaust manifold and configured to be driven by the second portion of the exhaust gas.

14. The power system of example 13, wherein the first turbine generator and the second turbine generator are arranged in series.

15. The power system of example 13, wherein the first turbine generator and the second turbine generator are arranged in parallel.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:
    an engine including one or more piston-cylinder arrangements, an intake manifold configured to receive and direct intake air into the one or more piston-cylinder arrangements for combustion to generate exhaust gas, and an exhaust manifold configured to receive the engine exhaust gas from the one or more piston-cylinder arrangements;
    an exhaust gas recirculation (EGR) system configured to receive a first portion of the engine exhaust gas, from an outlet of the exhaust manifold, to mix the first portion of the engine exhaust gas with fresh air as the intake air, and to supply the intake air into the intake manifold of the engine;
    a turbine generator in communication with the exhaust manifold and configured to be driven by a second portion of the engine exhaust gas, from another outlet of the exhaust manifold, that is different from the first portion of the exhaust gas to generate electrical power;
    a power network including at least one battery to store the electrical power generated by the turbine generator; and
    an electric compressor in fluid communication with the intake manifold and configured to be powered by the electrical power from the at least one battery of the power network and to compress at least a portion of the intake air for the engine.

2. The power system of claim 1, wherein the EGR system includes an EGR pump in communication with the exhaust manifold and configured to pump the first portion of the engine exhaust gas from the exhaust manifold to the intake manifold.

3. The power system of claim 2, wherein the EGR pump is an electric EGR pump that is powered by the electrical power from the at least one battery of the power network.

4. The power system of claim 2, wherein the EGR system further includes an EGR cooler for cooling the first portion of the engine exhaust gas.

5. The power system of claim 1, further comprising a motor-generator coupled to the engine and alternatively configured to be driven by the engine or to drive the engine.

6. The power system of claim 5, wherein the motor-generator, upon being driven by the engine, is configured to generate additional electrical power that is then also stored in the at least one battery of the power network, and, to drive the engine, is configured to be powered by the electrical power stored by the at least one battery of the power network.

7. The power system of claim 1, further comprising a controller coupled to the power network and configured to control distribution of the electrical power between the turbine generator and the electric compressor.

8. The power system of claim 7, wherein the controller is configured to independently command the turbine generator and the electric compressor.

9. The power system of claim 1, further comprising an exhaust treatment system in fluid communication to receive and treat the second portion of the engine exhaust gas downstream of the turbine generator.

10. The power system of claim 1, wherein the electric compressor is a first electric compressor configured to compress at least a first portion of the intake air and the power system further comprises a second electric compressor in communication with the intake manifold and configured to compress at least a second portion of the intake air for the engine.

11. The power system of claim 10, wherein the first electric compressor and the second electric compressor are arranged in series such that the second portion of the intake air is also the first portion of the intake air.

12. The power system of claim 10, wherein the first electric compressor and the second electric compressor are arranged in parallel such that the second portion of the intake air is different than the first portion of the intake air.

13. The power system of claim 1, wherein the turbine generator is a first turbine generator and the power system further comprises a second turbine generator in communication with the exhaust manifold and configured to be driven by the second portion of the exhaust gas.

14. The power system of claim 13, wherein the first turbine generator and the second turbine generator are arranged in series.

15. The power system of claim 13, wherein the first turbine generator and the second turbine generator are arranged in parallel.

16. A method of operating a power system of a work vehicle, comprising:
    operating an engine to generate exhaust gas including a first portion from an outlet of an exhaust manifold of the engine and a second portion different from the first portion from another outlet of the exhaust manifold of the engine;
    receiving the first portion of the exhaust gas by an exhaust gas recirculation (EGR) system;
    mixing the first portion of the exhaust gas with fresh air as intake air;
    supply the intake air into an intake manifold of the engine;
    arranging a turbine generator to be driven by the second portion of the exhaust gas to generate electrical power;
    storing the electrical power in at least one battery of a power network; and
    powering an electric compressor with the electrical power from the at least one battery of the power network to compress at least a portion of intake air for the engine.

17. The method of claim 16, wherein the EGR system includes an EGR pump that is powered by the electrical power from the at least one battery of the power network.

18. The method of claim 16, further comprising providing a motor-generator coupled to the engine to alternatively be driven by the engine or to drive the engine.

19. The method of claim 18, further comprising storing, in the at least one battery of the power network, additional electrical power generated by the motor-generator upon being driven by the engine.

20. The method of claim 16, further comprising controlling, with a controller, operation of the turbine generator and the electric compressor independently from one another.

* * * * *